United States Patent
Brotman et al.

(10) Patent No.: US 6,236,967 B1
(45) Date of Patent: May 22, 2001

(54) TONE AND SPEECH RECOGNITION IN COMMUNICATIONS SYSTEMS

(75) Inventors: Lynne Shapiro Brotman, Westfield; Randy G. Goldberg, Princeton, both of NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/100,611

(22) Filed: Jun. 19, 1998

(51) Int. Cl.[7] .................................................. G10L 21/00
(52) U.S. Cl. ...................... 704/270; 704/247; 704/251; 704/273; 379/67; 379/93.03; 379/88
(58) Field of Search .................................... 704/247, 260, 704/270, 246, 237, 251, 273; 379/67, 88, 93.03

(56) References Cited

U.S. PATENT DOCUMENTS

| | | | |
|---|---|---|---|
| 4,979,206 | * 12/1990 | Padden et al. ........................ | 379/67 |
| 5,315,688 | * 5/1994 | Theis .................................... | 704/237 |
| 5,553,119 | * 9/1996 | McAllister et al. .................. | 379/67 |
| 5,638,425 | * 6/1997 | Meador, III et al. ................ | 379/88 |
| 5,661,787 | * 8/1997 | Pocock ............................. | 379/101.01 |
| 5,732,395 | * 3/1998 | Silverman ........................... | 704/260 |
| 5,761,640 | * 6/1998 | Kalyanswamy et al. ........... | 704/260 |
| 5,903,864 | * 5/1999 | Gadbois et al. .................... | 704/251 |
| 5,907,597 | * 5/1999 | Mark ................................. | 379/93.03 |

* cited by examiner

Primary Examiner—William R. Korzuch
Assistant Examiner—Vijay Chawan
(74) Attorney, Agent, or Firm—Kenyon & Kenyon

(57) ABSTRACT

The present invention provides an apparatus and method for verifying address identifiers over a telecommunications network by first storing a plurality of zip codes in a database. A corresponding list of address identifiers is created and stored for each zip code. After receiving a spoken zip code from a user, the corresponding list of address identifiers is retrieved. Once the list of address identifiers is retrieved, a plurality of choices for at least some of the address identifiers is created. These plurality of choices contain words that rhyme with or sound like other address identifiers located in the retrieval group of address identifiers.

After the system receives a spoken address identifier from the user, the system queries the database for a match between the spoken address identifier and the stored address identifier. The user is then prompted to verify that the system accurately recognized the spoken address identifier. However, if a plurality of choices was created for the matched address identifier, the user is presented with the plurality of choices to select from instead of the matched address identifier. Whether the address identifier or the plurality of choices is presented to the user, the user is requested to verify that the system correctly recognized the spoken address identifier.

24 Claims, 4 Drawing Sheets

US 6,236,967 B1

TONE AND SPEECH RECOGNITION IN COMMUNICATIONS SYSTEMS

FIELD OF THE INVENTION

The present invention relates in general to improved speech and tone recognition systems and more particularly, to an improved method and apparatus for recognizing speech data based on speech and tone recognition techniques over a communications system.

BACKGROUND OF THE INVENTION

Recent advances in speech recognition technology have provided the impetus for the increasing commercialization of speech recognition technology in different market segments of various industries. One such industry that has experienced increased use of speech recognition system, is the telecommunications industry which strives to apply the technology in automated attendant systems for services or applications such as order taking, directory assistance, data entry to name a few. Proponents of speech recognition technology believe that it is well suited for telecommunications applications. In most applications of speech recognition technology in the telecommunications field, a user is prompted to speak into the mouthpiece of a telephone handset. The speech signals provided by the speaker are first converted into digital values through a sampling process, and thereafter the digital values are in turn converted into a sequence of patterns to allow the words uttered by the speaker to be recognized from a list or group of pre-stored words. Predetermined words within the list are typically stored as templates wherein each template is made of sequences of patterns of speech sounds better known as "phonemes". This type of recognition technique is commonly referred to as "whole word template matching". Over the last few years, the word-template-matching technique has been advantageously combined with dynamic programming to cope with nonlinear time scale variations between spoken words and pre-stored templates.

In spite of the recent technological advances in speech recognition technology, a series of factors, however operate to impede the commercialization of speech recognition systems. Prominent among such factors is the inability of speech recognition systems to easily distinguish homonyms, such as "to", "too" and "two". Equally problematic is the difficulty of recognizing words that may be uttered or even pronounced differently due to the effect of speakers' regional accents. It is also well known that speech recognition systems have some difficulty in separating from each other words that rhyme, or otherwise sound alike, such as "bear" and "pear", "but" and "pot".

In response to this problem, three solutions have been proposed. One such solution that is described in U.S. Pat. No. 5,212,730, is to use text-derived recognition model in concert with decision rules to differentiate various pronunciations of a word. Another solution proposes the use of context-related data and decision rules, in addition to stored templates, to facilitate more accurate recognition of spoken words. A third solution opts out of speech recognition all together in favor of receiving information from a user in the form of Dual Tone Multi-Frequency (DTMF) signals entered by a user from a touch-tone keypad of a telephone set. Although DTMF entries accurately represent numeric strings provided by a user, they are ill suited for applications in which the numeric strings include more than fifteen digits. The digits in such long string need to be re-entered, one at a time, if an error occurs at any time during the keying process. Of particular significance is the inability of DTMF entries to accurately represent alphabetic or alphanumeric string of characters since each key on a telephone keypad shares at least three letters.

SUMMARY OF THE INVENTION

We have realized that for certain speech recognition applications, numeric DTMF entries keyed by a caller can be used to improve the accuracy of speech recognition systems by serving as a pointer to limit the number of stored templates that need to be compared to speech data subsequently provided by the caller. In an embodiment of the principles of the invention, a communications system is arranged to prompt a user to provide a first set of information in the form of touch-tone entries on a dial pad. Thereafter, the user is prompted to provide a second set of information in the form of speech signals delivered to the transmitter of the handset of a telephone. The communications system uses the DTMF signals or data generated from the touch tone entries as a search key to retrieve only the stored templates associated with such DTMF data.

In an example of an implementation of the principles of the invention, a speech recognition system includes a database that stores the zip codes of a country. Associated with each zip code are stored templates of addresses within that zip code. For an order entry application, for example, the speech recognition system prompts a caller to enter on a telephone dial pad the zip code of the caller's home (or office) address. The speech recognition system then queries the database to determine whether the zip code entered by the caller matches one of the stored zip codes in the database. If so, the speech recognition system may repeat the matched zip code to confirm with the caller that the matched zip code is indeed accurate. If no match is found for the zip code provided by the caller, the speech recognition system prompts the caller to re-enter a new zip code. The speech recognition system may terminate the process if the caller enters no valid zip codes after a pre-determined number of attempts. Once a zip code is matched and confirmed, the speech recognition system prompts the caller to provide address information in the form of speech data. Thereafter, the speech recognition system uses the matched zip code to retrieve stored templates of addresses associated with such zip code. The speech recognition system then looks for a match between the speech data provided by the caller and one of the retrieved stored templates. If a match is found, then the caller is prompted to verify that the speech recognition system has accurately recognized the speech data provided by the caller. If a match is not found, the speech recognition system selects the address(es) closest to the received speech signals and presents such address(es) to the caller in "most close to less close" order.

DETAILED DESCRIPTION

Figure 1:
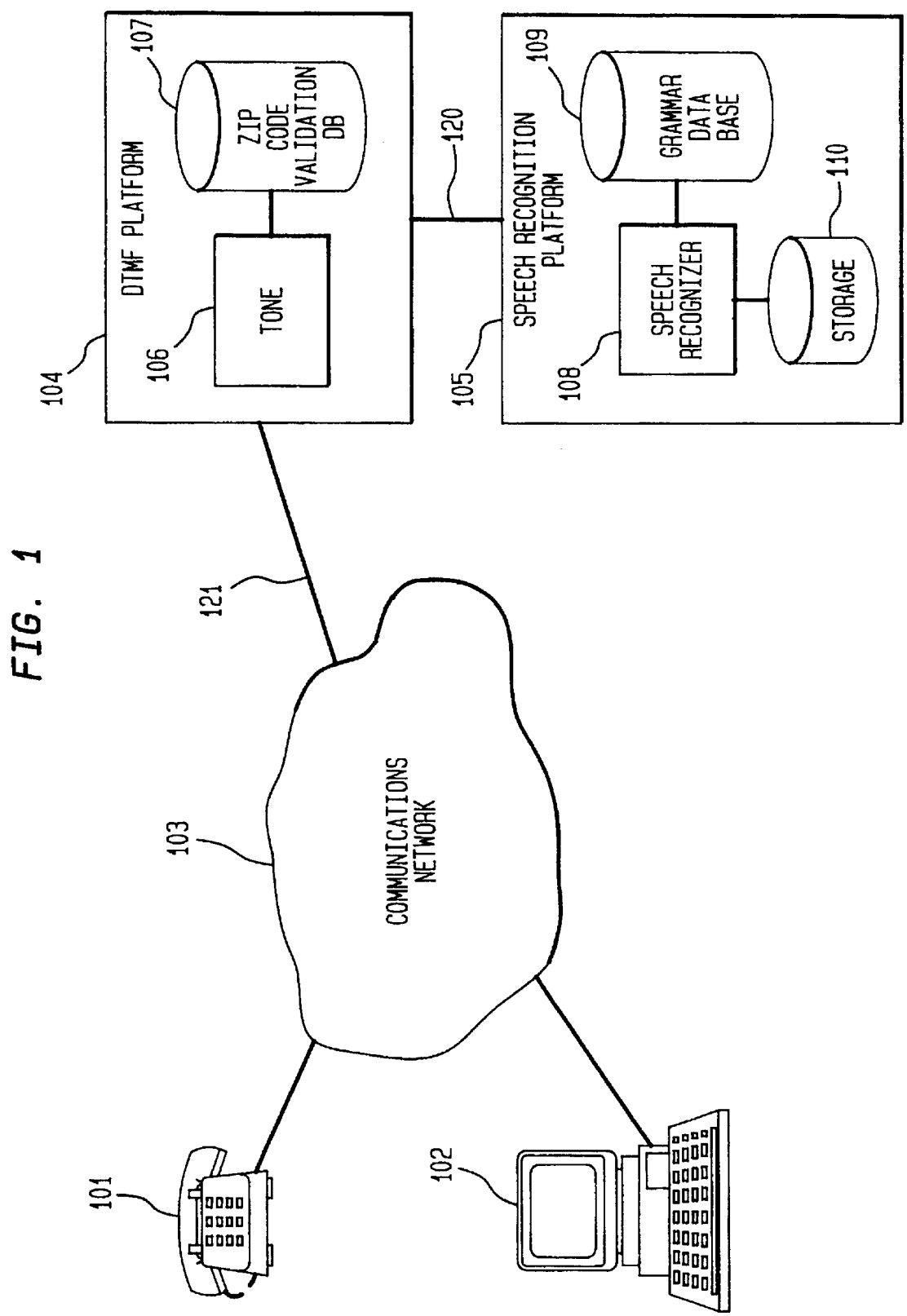
FIG. 1 shows in block diagram format an exemplary communications system that includes an illustrative speech recognition system suitably arranged to implement the principles of the present invention.
Figure 2:
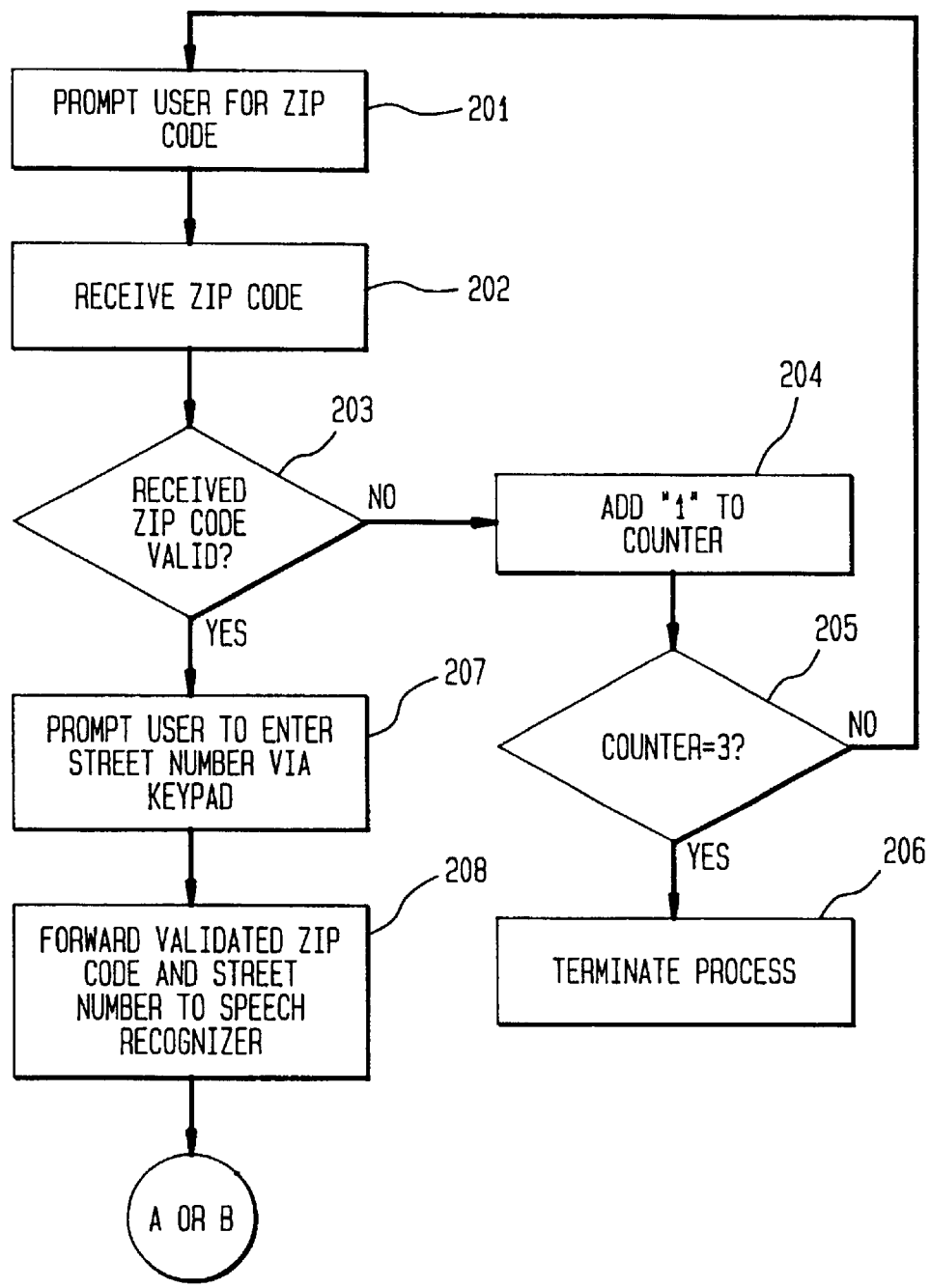
FIGS. 2, 3 and 4 are flowcharts illustrating steps performed by a speech recognition system to implement the principles of the present invention.

FIG. 1 shows in block diagram format an exemplary communications system that includes an illustrative speech recognition platform suitably arranged to implement the principles of the present invention. The communications system of FIG. 1 includes a communications network 103, Dual Tone Multi-Frequency (DTMF) platform 104 and a speech recognition platform 105. Although FIG. 1 depicts a single communications network 103, persons skilled in the art would readily recognize that several such networks may be included in a communications system without departing from the principles of the invention. Communications network 103 is comprised of a plurality of interconnected network office switches (not shown) that are processor-controlled, software-driven switching systems that are arranged to process calls from end-user communications devices such as telephone set 101. Alternatively, communications network 103 may include a plurality of interconnected processors adhering to a common protocol such as the Internet Protocol. Such interconnected processors may be driven by suitable communications software that allows end-user devices, such as Personal Computer (PC) 102 to function as a conventional telephone set. For PC 102 to operate as a conventional telephone set, PC 102 needs to be equipped with suitable sound cards, microphone and appropriate software. Hence, communications network 103 can be any type of network that enables communications end-user devices, such telephone set 101 or PC 102 to complete a call to DTMF platform 104. For example, communications network 103 can be a Public Switched Telephone Network (PSTN), a data network such as a local area network, a wide area network (e.g., the Internet, or an intranet).

Also shown on FIG. 1 is DTMF platform 104 that includes a Tone Information system 106 and zip code validation database 107. The operations of Tone Information system 106 are controlled by a call processing unit (not shown) that executes system software to perform a variety of functions. Specifically, the call processing unit of Tone Information system 106 executes a set of scripts of the system software to answer an incoming call, and to greet a caller with a pre-recorded voice announcement inviting the caller to enter specific information, such as a zip code or a street number. Such information is typically entered by callers in the form of DTMF signals, although Tone Information 106 may include a speech recognizer of its own to recognize information provided by a caller. Tone Information system 106 is also arranged to convert DTMF signals received from a caller into ASCII code that is subsequently transferred for verification to zip code validation database 107 or speech recognition platform 105, as appropriate. Zip code validation database 107 is a processor-controlled, software driven data base management system (DBMS) with storage medium containing all valid zip codes (in ASCII format) within a country or a region. Alternatively, the valid zip codes may be stored as speech grammar to allow recognition of zip codes provided by a caller in the form of speech signals. When zip code validation database 107 receives a zip code in ASCII format from Tone Information system 106, zip code validation database 107 attempts to match the received zip code to one of the zip codes stored therein. It is worth noting that although DTMF Platform 104 is shown in FIG. 1 as a system that is remote from communications network 103 for the sake of simplicity, persons skilled in the art would realize that DTMF Platform 104 can be an integral part of communications network 103 with one or more validation databases and one or more DTMF detection and recognition systems. Tone Information system 106 may be implemented using a modified Lucent Technologies Conversant® Voice Information System whose features and architecture are described in an article entitled "Conversant Voice System and Applications" by Pardue et al. in *AT&T Technical Journal* Vol. 65, Issue 5, pp. 34–47, September/October 1986.

DTMF platform 104 is connected to speech recognition platform 105 via a socket link 120 that is designed to allow fast transfer of data between DTMF Platform 104 and speech recognition platform 105. When one or both platforms are included in communications network 103, data transfer between the two platforms may take place via a signaling network that uses a common signaling protocol, such as the well-known Common Channel Signaling (CCS) protocol. Speech recognition platform 105 includes a speech recognizer 108, a grammar database 109 and storage medium 110. Speech recognizer 108 is a processor on which is loaded well-known speech recognition engine software, such as the AT&T Watson software. The speech recognition engine software is preferably a whole-word or sub-word based HMM speech recognizer that supports word spotting and continuous speech recognition in addition to user-defined vocabularies. The speech recognition engine software loaded on speech recognizer 108 is designed to accurately recognize in real time so-called "telephone speech" as well as speech from a microphone coupled to a sound card of a desktop processor. In actual implementation of the principles of the invention, the speech recognition engine software includes instructions associated with Viterbi beam-search techniques and Viterbi decoding algorithm for large vocabulary-recognition functions. In order to perform its speech recognition functions with additional accuracy, the speech recognition engine software may include other specialized software modules such as language models, and multi-pronunciation lexicons with corpus derived pronunciation probabilities. The speech recognition engine software that is loaded on speech recognizer 108, also includes an Application Program Interface (API) such as the well-known Microsoft Speech Application Program Interface (SAPI) that allows speech recognizer 108 to communicate with Grammar database 109 via a socket link that uses a common format such as the Microsoft SGF format. Grammar database 109 is a processor-controlled, software-driven database management system that stores phonemes or digital audio signals associated with addresses represented by street numbers and names, cities or towns.

Table 1 shows an illustrative representation of records that are stored on grammar database 109.

TABLE 1

| Address Grammar | | | |
| --- | --- | --- | --- |
| Zip Code | Street Name | Street Name | Range of Street Number |
| 07728 | | Grammar Data | 1–50 |
| 09665 | | Grammar Data | 1–2568 |

The left-most column of Table 1 shows a zip code field that serves as pointer or search key for database 109 to retrieve the phonemes corresponding to the street names in the middle column of Table 1. The right-most column of Table 1 indicates the range of possible street numbers for the street name on the same row. The records of Table 1 may be organized as hash table entries that allow quick and accurate recognition of speech data provided by a user. Additional information on applications of hashing techniques to speech recognition can be found in B. Lowere and D. R. Reddy, "The HARPY speech understanding system," *Trends in Speech Recognition* (W. Lee, ed.) Prentice-Hall Inc., New York.

Table 2 below shows an alternative arrangement for the records in grammar database 109. In Table 2, the records for street names and street number ranges are indexed by a zip code.

TABLE 2

Zip Code 21045

| PHONEMES FOR STREET NAMES | STREET NUMBERS RANGE |
|---|---|
| Blaine Street | 1–50 |
| Main Street | 1000–1140 |
| High Street | 1–100 |
| Walker Street | 2500–2580 |

In Table 2, under Zip code 21045 are stored street names "Blaine Street", "Main Street", "High Street", and "Walker Avenue". Each record also includes the range of street numbers for each street located within the 21045 zip code. For example, "Blaine Street" ranges from address numbers 1–50 while "Walker Avenue" ranges from address numbers 2500–2580.

Speech recognizer 108 uses the street numbers range field in Table 1 or 2 to resolve ambiguities between address identifiers located within the same zip code. For example, the range of street numbers is considered in differentiating street names that rhyme or sound alike such as Main and Blaine. If the speech signals delivered by a user seem to indicate that the user lives at 1123 Main Street while Blaine Street only has street numbers from 1–50, then speech recognizer 108 would discard the phonemes associated with Blaine Street as one of the choices to be matched.

An illustrative process contemplated by the invention is initiated in step 201 when Tone information system 106 prompts a user at telephone set 101 to enter a zip code. Upon receiving the zip code provided by the user, as indicated in step 202, Tone information system 106 launches a query on zip code validation database 107 to assess whether the received zip code is valid. Validity of a zip code is ascertained based on whether a match is found between the received zip code and one of the zip codes previously stored on database 107, as set forth in step 203. If a match is not found, as determined in step 203, a counter is increased by one in step 204. Thereafter Tone Information system 106 determines in step 205 whether the counter is equal to 3. If so, the process is terminated in a conventional manner as indicated in step 206. If the counter is not equal to 3, steps 201 to 205 are repeated until either the received zip is determined valid in step 203 or the process is terminated in step 206. Optionally, Tone Information system 106 may also prompt the user in step 207 to enter the user's street number via the keypad of telephone set 101. When the received zip code is valid, as determined in step 203, Tone Information system 106, in step 208, forwards the validated zip code and the street number, as appropriate, to speech recognizer 108. From this point forward, different implementations of the principles of the invention can be considered.

Figure 3:
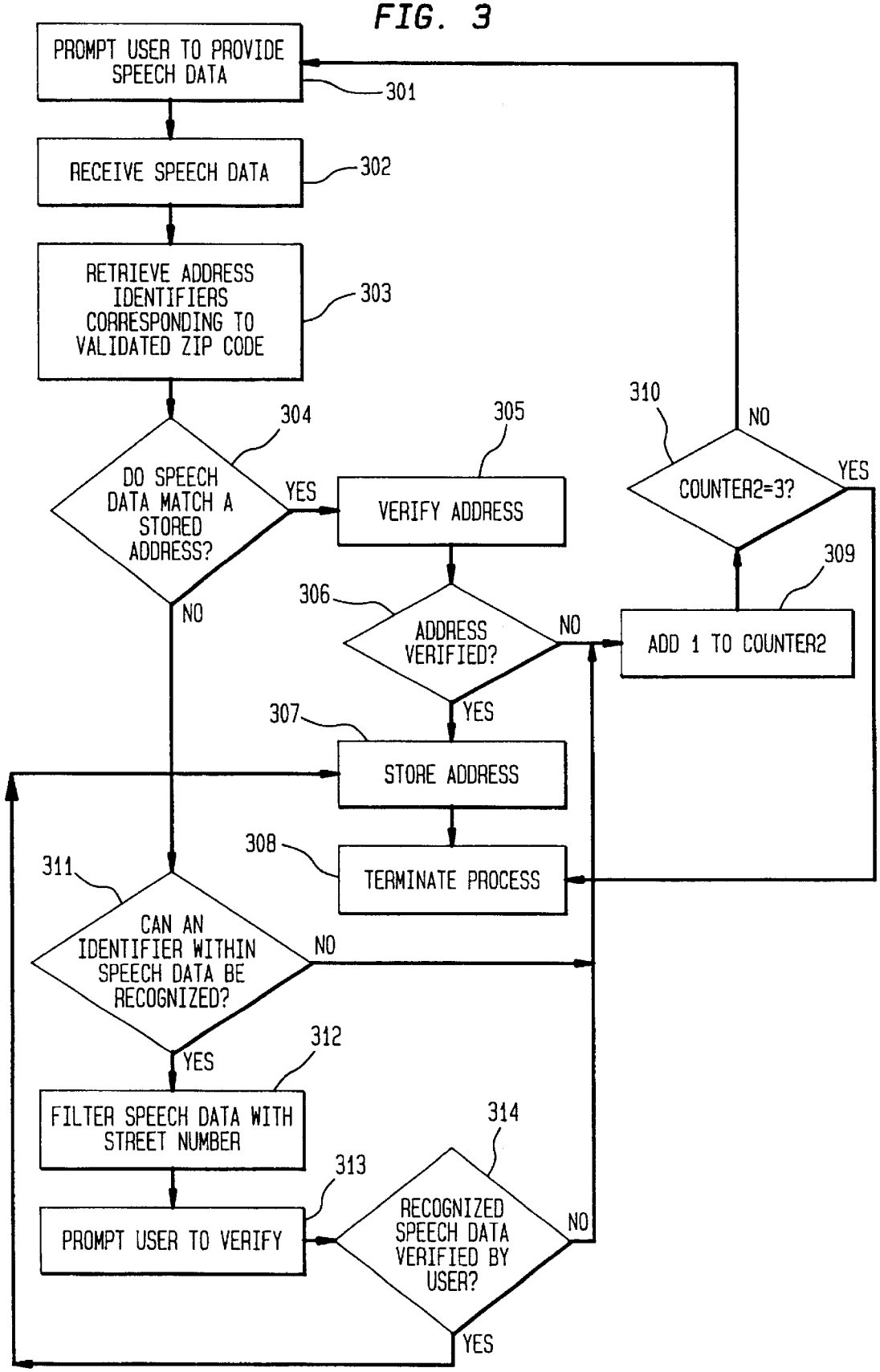

FIG. 3 is an illustrative process of one of such implementations. Upon receiving the validated zip code, and the street address, as appropriate, speech recognizer 108 in step 301, prompts the user to provide (via the mouthpiece of telephone set 101) speech data associated with the user's address. After receiving the speech data provided by the user, as indicated in step 302, speech recognizer 108, in step 303, uses the validated zip code as a search key to retrieve from grammar database 109 address identifiers associated with the validated zip code. Thereafter, speech recognizer 108 launches a query on grammar database 109 in order to attempt to match the received speech data to one of the grammar entries in grammar database 109. If a match is found, as determined in step 304, speech recognizer 108 prompts the user to verify the recognized address in step 305. Speech recognizer 108 may prompt the user, for example, to say "Yes" if the recognized address is correct or "No" if the recognized address is incorrect. If a "Yes" answer is uttered by the user, as determined in step 306, the recognized address is recorded in storage area 110, as set forth in step 307, and the process is terminated thereafter in a conventional manner in step 308. If a "No" answer is uttered by the user, as determined in step 306, speech recognizer 108 increments a counter by "1" and thereafter, assesses whether the counter is equal to 3. If so, the process is terminated in a conventional manner in step 308. Otherwise, steps 301 to 310 are repeated until the speech data provided by the user is recognized or the process is terminated in step 308.

If the speech data received from the user cannot be matched to one of the entries in grammar database 109, as determined in step 304, speech recognizer 108 attempts to recognize at least one identifier in the speech data. Such identifier can be for example, a street name, a city or township, or the state in which the township or city is located. If no such identifier can be recognized, as determined in step 311, a counter is incremented by "1". Thereafter, a determination is made as to whether the counter is equal to 3. If so, the process is terminated in a conventional manner, as indicated in step 308. Otherwise, speech recognizer 108 prompts the user to provide speech data preferably at a slower pace, as steps 301 to 311 are repeated. When an identifier within the speech data provided by the user can be recognized, speech recognizer 108 uses such identifier and the street number as input to filter the speech data, in step s 312, by discarding, for example, street names for which the received street number is greater than the highest possible numbers for these streets. When the speech data provided by the user is recognized as a result of the filtering process, speech recognizer 108, in step 313, prompts the user to verify such recognized speech data. If the user verifies the speech data, as determined in step 314, speech recognizer 108, stores the recognized address in step 307 before terminating the process in a conventional manner in step 308. If the recognized speech data is not verified by the user, as determined in step 314, steps 309 and 310 are performed and steps 301 to 314, as appropriate are repeated until either the received speech data is recognized or the process is terminated due to the failure of speech recognizer 108 to recognize the received speech data after a predetermined number of attempts (3 attempts, in this example). When speech recognizer 108 has failed to recognize speech data received from a user, the call can be transferred to an attendant for processing.

Figure 4:
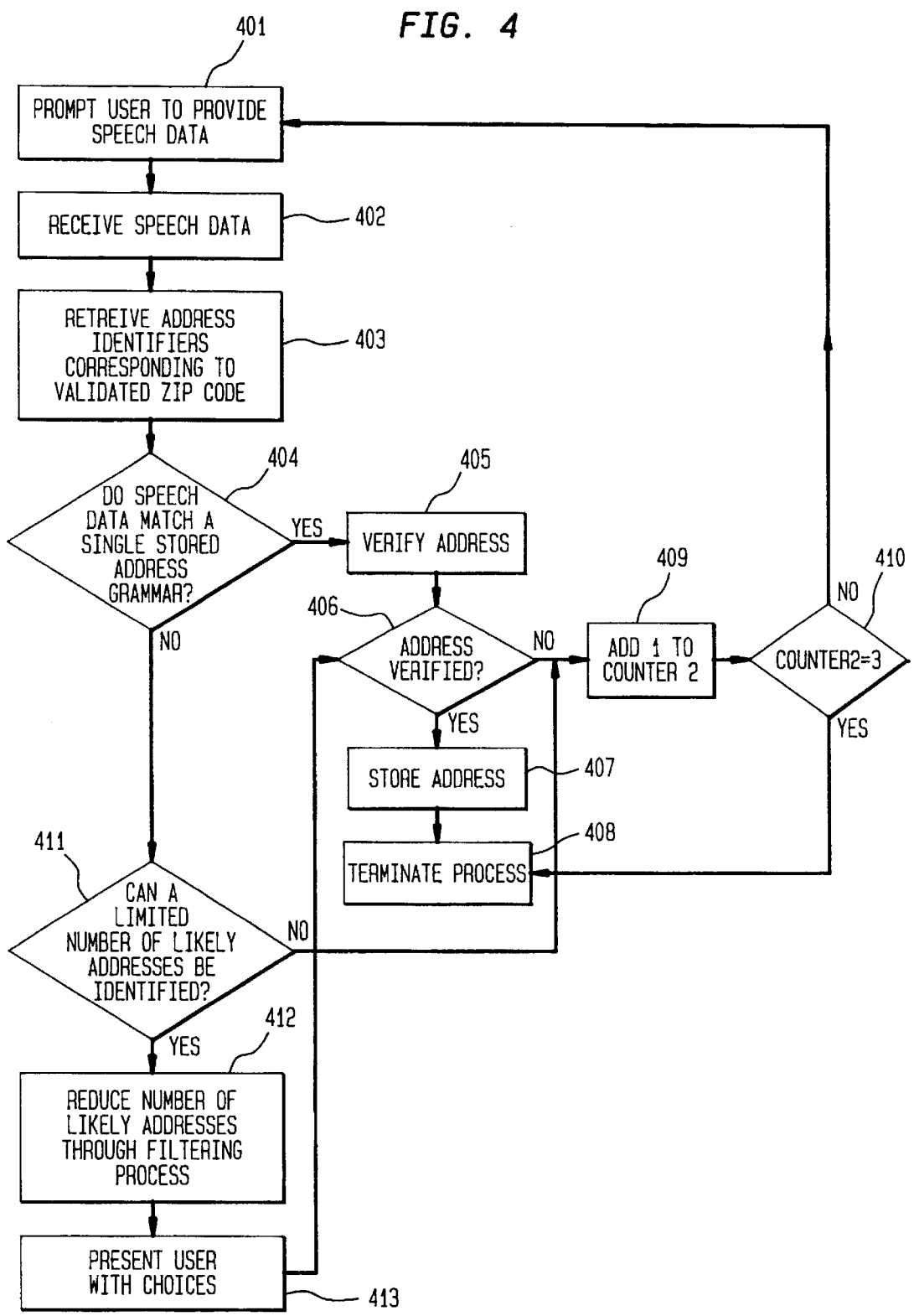

FIG. 4 is a flowchart illustrating alternative steps performed by speech recognizer 108 to implement the principles of the invention. The process illustrated in FIG. 4 is initiated in step 401 when speech recognizer 401 prompts a user to provide speech data via the mouthpiece of telephone set 101 or the microphone of PC 102. Upon receiving the speech data from the user in step 402, speech recognizer 108, in step 403, uses the validated zip code as a search key to retrieve from grammar database 109 address identifiers associated with such zip code. Thereafter, speech recognizer 108, in step 404, launches a query on grammar database 109 to ascertain whether the received speech signals match a single address grammar stored on grammar database 109. If so, the matched address is presented to a user for verification in step 405. If the matched address is confirmed by the user, as determined in step 406, speech recognizer 108, in step 407, records the matched address and, thereafter terminates the process in step 408. If the user does not confirm the matched address, as determined in step 406, a counter is incremented by one. Thereafter, speech recognizer 108, in step 406, ascertains whether the counter is equal to a pre-determined number such as three in this example. If so, speech recognizer 108 terminates the process in a conventional manner. If the counter is less than three, steps 401 to 406 are repeated until either the speech data is recognized or the process is terminated.

When the speech data cannot be matched to a single address, as determined in step 404, speech recognizer 108 in step 411, ascertains whether any of the address grammars in the retrieved list "rhyme with," or "sound like" the received speech data. If so, speech recognizer 108 in step 412 uses a filtering process to screen out unlikely address grammars. The filtering process includes eliminating address grammars that may be out of a predetermined range although such address grammars may sound alike to or may rhyme with the received speech data. When the likely address grammars are reduced to a manageable number, speech recognizer 108 in step 413, presents the user with the likely recognized addresses (e.g., "Maine Street" and "Blaine Street". Specifically, speech recognizer 108 may use a computer-generated voice to prompt the user to press 1 for "Maine", 2 for "Blaine", 3 for "Paine" or 0 for "none of the above". Alternatively, speech recognizer 108 could prompt the user to utter the number corresponding to the correct address among a plurality of addresses presented to the user. If the user does not select any of the addresses presented (e.g., selects 0 for none of the above) as determined in step 406, steps 409 to 410 described above are performed. When the user selects ones of the addresses presented, speech recognizer 108, in step 409, records the selected address in storage area 110 and proceeds to terminate the process in step 411.

The foregoing merely illustrates certain aspects of the invention. Persons skilled in the art will be able to devise numerous arrangements which, although not explicitly shown or described herein, embody the principles of the invention and are within its spirit and scope.

What is claimed is:

1. A method of recognizing speech data comprising the steps of
   prompting a user to provide at least one set of numeric data via a keypad of a communications device;
   querying a database to match said at least one set of numeric data to one or more entries in said database;
   retrieving a pre-stored set of sequence of speech patterns using said at least one set of numeric data as a search key for such retrieving;
   prompting said user to provide speech data via a mouthpiece of said communications device; and
   in response to receiving said speech data, comparing said speech data to said sequence of speech patterns to recognize said speech data.

2. The method of claim 1 wherein said at least one set of numeric data is a zip code.

3. The method of claim 1 wherein said speech data is a home address.

4. The method of claim 1 wherein said at least one set of numeric data is a zip code and said speech data is a home address.

5. The method of claim 1 wherein said at least one set of numeric data includes a zip code and a street number.

6. The method of claim 1 wherein said first set of numeric data is a zip code and said speech data is a home address.

7. The method of claim 1 wherein said first set of numeric data includes a zip code and said second set of numeric data is a street number.

8. A method of recognizing speech data comprising the steps of
   prompting a user to enter a first set of DTMF numeric data via a keypad of a communications device;
   querying a database to match said first set of numeric data to an entry in said database;
   prompting said user to enter a second set of DTMF numeric data via said keypad of said communications device;
   comparing said second set of numeric data to pre-stored range of digits;
   retrieving from said second database a pre-stored set of sequence of speech patterns using said first set of DTMF numeric data as a search key for such retrieving;
   prompting said user to provide speech data via said communications device; and
   in response to receiving said speech data from said user, comparing said speech data to said sequence of speech patterns using said second set of DTMF numeric data as input to recognize said speech data.

9. The method of claim 8 wherein said second set of numeric data is also used to retrieve said sequence of speech patterns.

10. The method of claim 8 wherein said speech data is a home address.

11. A method of recognizing speech data comprising the steps of:
    prompting a user to provide one or more sets of Dual Tone Multi Frequency (DTMF) numeric data via a keypad of a communications device;
    prompting said user to provide speech data via said communications device;
    recognizing said speech data using said DTMF numeric data as input to facilitate said speech recognition.

12. The method of claim 11 wherein said one or more sets of numeric data is selected from a group which includes a zip code and a street number and wherein said speech data is a street name.

13. A method for verifying an address identifier over a network comprising the steps of:
    receiving a zip code provided by a user in the form of a DTMF signal;
    querying a database of stored zip codes wherein each stored zip code is indexed to a group of address identifiers;
    determining whether said received zip code matches one of said stored zip codes;
    if one of said stored zip codes matches the received zip code, retrieving said indexed group of address identifiers corresponding to said match zip code;
    receiving a speech signal from said user; and
    recognizing said speech signal by verifying that said speech signal matches one of said address identifiers.

14. The method according to claim 13, wherein said address identifiers include names of cities and towns.

15. The method according to claim 13, wherein said address identifiers include names of states.

16. The method according to claim 13, wherein said address identifiers are names of streets.

17. The method according to claim 16, wherein said names of streets further include street numbers.

18. The method according to claim 13 wherein said recognizing step comprises the steps of:
    gathering from said speech signal information to generate a plurality of likely addresses;

filtering said likely addresses to derive a limited number of choices of likely addresses; and presenting said limited number of choices of likely addresses to said user for verification.

19. The method of claim 18 further including the step of:

receiving a signal from said user indicative of a selection by said user of one of said likely addresses; and storing said user-selected address in a storage area.

20. The method of claim 18 wherein said filtering step comprises the step of screening out one or more likely addresses for which street numbers as recognized in said speech signal, are outside of a predetermined range for street names associated with said one or more likely addresses.

21. The method according to claim 13, wherein said received zip code is provided by said user as speech data.

22. The method according to claim 13, wherein received zip code is provided by said user as dual tone multi frequency (DTMF) signal from a keypad.

23. A speech recognition system for recognizing address identifiers comprising:

a first database for storing zip codes;

a second database for storing address identifiers indexed by said zip codes; and a speech recognizer which a) is coupled to said first and second databases and which retrieves address identifiers from said second database in response to receiving a user-provided zip code and b) includes a software-driven processor that recognizes speech signals received from a user and c) means for prompting said user to provide data via a device capable of producing a DTMF signal.

24. The speech recognition system of claim 23, further comprising means for prompting said user to provide data to said speech recognition system via a microphone of a communications device.

* * * * *